United States Patent Office 2,967,087
Patented Jan. 3, 1961

2,967,087

SYNTHESIS OF METAL CARBONYLS

Thomas H. Coffield, Birmingham, Mich., assignor to Ethyl Corporation, New York, N.Y., a corporation of Delaware No Drawing. Filed Mar. 13, 1957, Ser. No. 645,674

7 Claims. (Cl. 23—14)

This invention relates to the preparation of organometallic compounds and in particular to preparation of new compositions of matter containing an alkali metal salt of manganese carbonyl which is a valuable intermediate in the preparation of organometallic compounds.

An object of this invention is to provide metal salts of manganese carbonyl in a medium wherein the salt can function as a valuable intermediate in the process for preparing organo-manganese compounds. A further object is to provide a process for the preparation of metal salts of manganese carbonyl which are valuable synthesis intermediates. Another object of this invention is to provide a new composition of matter valuable as an intermediate in the preparation of organo-manganese compounds.

It has been found that an alkali metal salt of manganese carbonyl in an ether medium is a valuable intermediate in the preparation of organo-manganese carbonyl compounds. This composition is provided by reacting dimanganese decacarbonyl with an alkali metal reactant in the ether medium. By alkali metal reactant is meant an elemental alkali metal, a finely divided alkali metal dispersed in an appropriate organic medium or an amalgam of the alkali metal.

The composition of this invention comprises a metal manganese pentacarbonyl in an ether medium; certain ethers being preferred. Thus, ethers containing a plurality of C—O—C linkages, are preferred as they are found to be particularly desirable reaction media for the synthesis of organo-manganese compounds. Examples of such ethers are the diethyl and dibutyl ethers of diethylene glycol. A further class of preferred ethers are the cyclic ethers, of which tetrahydrofuran and dioxane are representative examples. This latter class of compounds has properties of volatility and solvation which render them particularly useful as reaction media for the preparation of organo-manganese compounds from metal manganese carbonyl salts.

A preferred metal in the preparation of the composition of the present invention is sodium. The sodium manganese pentacarbonyl which results from the reaction of a sodium dispersion or sodium amalgam with an ethereal solution of dimanganese decacarbonyl is an extremely valuable intermediate in the preparation of certain organo-manganese compounds in high yield, as will be pointed out in greater detail hereinafter.

The reaction between an alkali metal reactant and manganese carbonyl is conveniently conducted at temperatures ranging from about 10° C. to the reflux temperature of the ether medium used. Ordinarily the reaction is exothermic and is self-initiating at room temperature. However, it is often convenient and desirable to conduct the reaction at elevated temperatures in order to obtain a complete conversion of the manganese carbonyl to an alkali metal manganese pentacarbonyl. After completion of the reaction between the alkali reactant and the manganese carbonyl, the excess alkali metal reactant and/or mercury, if an amalgam is used, is conveniently separated from the ethereal solution of alkali metal manganese pentacarbonyl. This is accomplished conveniently by settling and decantation or by centrifugation. The solution is also conveniently filtered to separate unreacted solids.

The ethereal solution of alkali metal manganese pentacarbonyl is a valuable intermediate in the preparation of organomanganese carbonyl compounds. For example, methyl manganese pentacarbonyl is conveniently prepared by the reaction of a tetrahydrofuran solution of sodium manganese pentacarbonyl and dimethyl sulfate.

The alkali metal manganese pentacarbonyl-ether composition of the instant invention are also used in the preparation of acyl manganese pentacarbonyl compounds, which compounds are valuable fuel additives. These acyl manganese pentacarbonyls are prepared by the reaction of an alkali metal manganese pentacarbonyl with the halide of a carboxylic acid.

The following examples in which all parts are by weight or otherwise specified are illustrative of embodiments of the present invention.

EXAMPLE I

A reaction vessel equipped with gas inlet and outlet means, means for agitation and means for heating and cooling was flushed with nitrogen and charged with 3 parts of dimanganese decacarbonyl in 44 parts of tetrahydrofuran and 2 parts of a 50 percent sodium dispersion in white mineral oil. The mixture was stirred at 50° C. for 3 hours and then allowed to settle. The supernatent liquid was decanted and divided into aliquots. The dimanganese decacarbonyl solution in tetrahydrofuran had a yellow color prior to treatment with the sodium dispersion; however, after the reaction period, the supernatent solution was colored amber.

A 20 milliliter aliquot of the amber solution was treated with 50 milliliters of water and the resulting mixture was titrated with 0.1 normal hydrochloric acid, the end point being determined with pH paper. Neutralization was affected at 43 milliliters whereas the calculated amount of acid was 56 milliliters. This shows a 77 percent conversion to sodium manganese pentacarbonyl.

EXAMPLE II

Twelve parts of manganese carbonyl were converted to the sodium salt in 133 parts of tetrahydrofuran using 200 parts of a 1 percent sodium amalgam. The supernatent tetrahydrofuran-sodium manganese pentacarbonyl composition contained in a reaction vessel equipped with stirring means and means for maintaining the contents in an inert atmosphere of $N_2$ was reacted with agitation at 10° C. with a solution containing 14 parts of N-methyl-N-nitroso-p-toluene sulfonamide in 22 parts of tetrahydrofuran. The color of the solution turned red and slowly darkened. A gas was slowly evolved. The gas was collected and identified as containing only carbon monoxide and nitrogen. The mixture was stirred for one-half hour and then flash distilled, the distillate being collected at the temperature of Dry Ice. The tetrahydrofuran was removed from the distillate via a packed column at reduced pressure and a temperature of 30°. A deep red residual liquid remained which was distilled through a micro column to yield a deep red liquid boiling at 27° at a reduced pressure of 11 millimeters. Infrared analysis of this liquid showed the characteristic metal carbonyl band and a nitrosyl band. This manganese nitrosyl carbonyl $(NO)Mn(CO)_4$, on analysis was found to contain 28.0 percent manganese (calculated, 27.9 percent).

To a solution containing 6.6 parts of sodium manganese pentacarbonyl in 44 parts of tetrahydrofuran was added a solution containing 4.4 parts of mercuric chloride. There was an immediate reaction resulting in a formation of a gray crystalline precipitate which was recrystallized from a mixture of dimethyl formamide and ethanol. Analysis of the light gray needles showed the compound has the formula HgClMn(CO)$_5$. This salt decomposes without melting at above 170° C., is insoluble in hydrocarbon solvents and is stable to air. The infrared spectrum confirms the relationship to manganese carbonyl.

The above example is illustrative of the compounds which are conveniently prepared through use of the ethereal alkali metal manganese pentacarbonyl compositions of this invention. The following example is further indicative of a preparation utilizing the composition of this invention.

EXAMPLE III

A solution of sodium manganese pentacarbonyl in 88 parts of tetrahydrofuran was prepared by reacting 12 parts of manganese carbonyl with 3 parts of a 50 percent sodium dispersion in mineral oil, and to the solution was added 7.5 parts of dimethyl sulfate, (CH$_3$)$_2$SO$_4$. There was an immediate reaction accompanied by a rise in temperature, a small amount of precipitation and gelation of the mixture. The precipitate was identified as NaCl. After standing overnight in an inert atmosphere, the reaction mixture was added to 500 parts of ice water, shaken thoroughly and filtered. Cautious air drying was necessary since the product was quite volatile. Recrystallation from low boiling petroleum ether gave a crystal product melting it from 94.5 to 95° C. The yield was 59.5 percent of theory and the product analyzed very closely for the carbon-hydrogen-manganese content calculated for methyl manganese pentacarbonyl, CH$_3$Mn(CO)$_5$, found C, 34.5 percent; H, 1.37 percent; Mn, 26.4 percent; calculated C, 34.3 percent; H, 1.43 percent; Mn, 26.2 percent.

EXAMPLE IV

The procedure of Example I was repeated except that 1.5 parts of dimanganese decacarbonyl in 7.1 parts of tetrahydrofuran were reacted with 1 part of the sodium dispersion at an initial temperature of 23° C. The reaction mixture rose to 60° C. and after settling was a clear amber solution of sodium manganese pentacarbonyl.

EXAMPLE V

A 1 percent sodium amalgam was prepared from 2 parts of sodium and 198 parts of mercury. This amalgam was covered with a solution of 5 parts of manganese carbonyl in 133 parts of tetrahydrofuran. The amalgam and solution were kept under nitrogen as was the reaction mixture which was shaken for one hour to affect reaction. On initiation of the agitation there was an immediate rise in temperature indicating a rapid and complete reaction. The reaction mixture was centrifuged for one hour to settle finely dispersed solids, and the supernatant was a clear amber solution which darkened rapidly on exposure to air. Treatment of an aliquot with water and subsequent titration with hydrochloric acid showed that a 90 percent yield of sodium manganese pentacarbonyl was produced by the reaction, giving a solution having about 4 percent sodium manganese pentacarbonyl.

EXAMPLE VI

The procedure of Example I is repeated using 50 parts of dibutyl carbitol (the dibutyl ether of diethylene glycol) in place of tetrahydrofuran and 2 parts of potassium in lieu of sodium. A solution of potassium manganese pentacarbonyl results.

EXAMPLE VII

The procedure of Example III is repeated using 5 parts of manganese pentacarbonyl in 500 parts of dioxane as a medium and a twofold excess of a lithium amalgam in place of the sodium amalgam. A solution containing about 1 percent lithium manganese pentacarbonyl is obtained. This solution is conveniently evaporated to one-tenth its original volume before use in further synthesis.

EXAMPLE VIII

The procedure of Example I is repeated using 400 parts of diethyl ether as a solvent and 5 parts (a twofold excess) of a rubidium dispersion in place of the sodium. A dilute solution of rubidium manganese pentacarbonyl results having about 1 percent rubidium manganese pentacarbonyl.

EXAMPLE IX

Cesium manganese pentacarbonyl is prepared in butyl ether according to the procedure in Example I by using 3 parts of cesium and 5 parts of manganese pentacarbonyl dissolved in 50 parts of dibutyl ether.

EXAMPLE X

Nine parts of manganese pentacarbonyl dissolved in 30 parts of 1,4-dioxane are treated with an excess of 50 percent sodium dispersion in mineral oil according to the procedure of Example I to prepare a dioxane solution containing about a 30 percent concentration of sodium manganese pentacarbonyl. This solution is conveniently diluted with 6 parts of dioxane for further use.

The above examples are illustrative of compositions of this invention and their prepartion. The following example demonstrates that alkali metal salts of manganese carbonyl useful in the synthesis of organo-manganese compounds cannot be prepared by the use of ordinary hydrocarbon solvents.

EXAMPLE XI

In a glass reaction vessel similar to that described in Example I was placed a solution of 2 parts of dimanganese decacarbonyl and 88 parts of benzene. The system was flushed with nitrogen and 1 part of sodium dispersed in mineral oil was added. The mixture was heated with rapid stirring to 75° percent and then was held at 50° for 6 hours. After standing overnight, the sodium was filtered off and the benzene was carefully evaporated to give 1.6 parts and an 80 percent recovery of unreacted manganese carbonyl.

The above procedure is repeated but instead of evaporating the benzene solution, 5 parts of dimethyl sulfate are added and the mixture is heated and then hydrolyzed in 500 parts of ice water. No methyl manganese pentacarbonyl is recovered from the mixture. This indicates that sodium manganese pentacarbonyl is not susceptible to preparation in concentration adequate for use in further synthesis in an ordinary hydrocarbon solvent.

The ethers applicable to the process of this invention include the lower alkyl ethers, cyclic ethers, and ethers containing a plurality of C—O—C linkages. Those ethers which boil above 25° C. are most applicable. Examples of these include ethyl butyl ether, dibutyl ether, iso-butyl iso-propyl ether, methyl neo-pentyl ether, diethyl ether of diethylene glycol, $$C_2H_5OC_2H_4OC_2H_4OC_2H_5$$

the dibutyl ether of diethylene glycol, tetrahydrofuran, 1,4-dioxane, 1,3-dioxane, substituted dioxanes, and the like. Generally, a saturated organic ether which is free of other reactive groups and which contains no active hydrogen is suitable. The ethers are free of olefinic unsaturation, and contain at least about 4 carbon atoms. Ethers having from 4 to about 12 carbon atoms are found to be most useful. As pointed out, however, the cyclic ethers, including tetrahydrofuran and dioxane, constitute a preferred type of ether.

The compositions of this invention are conveniently prepared from ethereal solutions of manganese pentacarbonyl which contain from less than 1 part of man-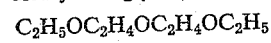

ganese carbonyl to 100 parts of ether to as much as 1 part of manganese carbonyl to about 5 parts of ether. A preferred range of ether solution of manganese carbonyl comprises those solutions having from about 9 to about 20 parts of manganese carbonyl to 100 parts of ether. These solutions are preferred as a readily reactable composition of alkali metal manganese pentacarbonyl in ether results from their use.

Thus, the compositions of this invention comprise alkali metal manganese pentacarbonyl solutions containing from about 1 part alkali metal manganese pentacarbonyl to 100 parts of ether to those solutions having 30 parts of alkali metal manganese pentacarbonyl to 100 parts of ether. The preferred compositions of this invention are those which contain from about 10 to about 20 parts of alkali metal manganese pentacarbonyl in 100 parts of ether.

The alkali metals used to prepare the alkali metal manganese pentacarbonyl compositions of this invention include lithium, sodium, potassium, rubidium, cesium and francium. These are conveniently reacted with an ethereal solution of manganese pentacarbonyl as a metal, a dispersion of the metal in a suitable carrier or an amalgam of a metal.

Suitable carriers for the alkali metals include inert organic liquids which are miscible with the ether solution of manganese carbonyl and in which the alkali metal can be dispersed. When the ether employed is capable of dispersing the alkali metal, this procedure is advantageous as the resulting composition of alkali metal-manganese carbonyl in ether is obtained in a purer form. However, refined white mineral oil has been found to be a suitable carrier for the alkali metal.

Sodium is a particularly preferred metal in the process of preparing the compositions of this invention as it has been found that ethereal solution of sodium manganese pentacarbonyl are particularly reactive and give high yields of organometallic derivatives of manganese pentacarbonyl when reacted with suitable reagents.

In order to completely utilize the manganese carbonyl reactant in the process of this invention, it is desirable to prepare the alkali metal manganese pentacarbonyl salt from an excess of alkali metal reactant. Thus, as much as a 4 fold excess or more of alkali metal is conveniently employed, however, from a 1.1 to 3 fold excess is ordinarily satisfactory.

The compositions of this invention are conveniently prepared at temperatures ranging from about 10° C. to about 100° C., the upper limit being dependent on the boiling point of the particular ether used. In many instances the reaction takes place at room temperature or below, but sometimes it is desirable to heat with reaction mixture above room temperature.

After the reaction is complete the excess alkali metal is preferably removed before the compositions of this invention are used in further synthesis. This may be done by filtration of the reaction mass, by settling and decantation or centrifugation and decantation. In certain instances, however, it is not necessary to remove the unreacted solids from the reaction mixture before further manipulated steps are taken; however, it is preferred to use the compositions of this invention as clear supernatent substances which contain no residual solids which may complicate the separation of products prepared in further synthesis.

The compositions of this invention are sensitive to oxidation and it is thus advisable to keep the alkali metal manganese carbonyl ether solutions under an inert atmosphere such as nitrogen, argon or the like. However, these compositions are stable in the presence of moisture and water and may be diluted with water for the purposes of determining the amount of metal manganese carbonyl salt contained therein as illustrated in Example I.

Compounds prepared from the compositions of this invention find utility as additives to liquid hydrocarbons, and in particular certain organo manganese carbonyl compounds are superior antiknock agents when added to gasoline which is used as a fuel for spark ignition internal combustion engines. Methyl manganese pentacarbonyl is an example of such a compound.

To demonstrate the superior antiknock effectiveness of hydrocarbon fuel blended with organo manganese carbonyl compounds derivable from the products of this invention comparative tests were made on fuels to which were added methyl manganese pentacarbonyl, and the same fuel to which no antiknock agent was added. The fuel used in these tests was a primary reference fuel having an octane number rating of 80 which is prepared by admixing 80 percent of iso-octane with 20 percent n-heptane. These tests were conducted on a single cylinder CFR standard test engine according to the American Society for Testing Materials; Procedure D-908-51. This procedure is referred to as the research method for antiknock testing. The 80 octane primary reference fuel was chosen for the test as it has been found that the addition of a relatively small amount of additives to this fuel gives a change in octane number which is readily measured by the above procedure to a high degree of reproducability. The results of these tests are summarized in Table I.

*Table I*

| Additive | Metal, g./Gal. | Octane No. |
|---|---|---|
| Methyl Manganese Pentacarbonyl | 1.02 | 94.3 |
| Do | 2.01 | 100.0 |
| No Additive | | 80.0 |

With reference to Table I, it can be seen that the addition of a relatively small quantity of methyl manganese pentacarbonyl vastly improves the octane number of the fuel.

I claim:
1. Process for the preparation of an alkali metal manganese pentacarbonyl which comprises reacting dimanganese decacarbonyl with an alkali metal reactant at temperatures of from 10 to about 100° C. in the presence of a saturated organic ether having at least about 4 carbon atoms.

2. Process for the preparation of sodium manganese pentacarbonyl which comprises reacting sodium with dimanganese decacarbonyl at temperatures of from about 10 to 100° C. in the presence of a saturated organic ether having at least about 4 carbon atoms.

3. The process of claim 2 wherein said ether is a cyclic ether.

4. Process of claim 3 wherein said cyclic ether is tetrahydrofuran.

5. As a new composition of matter, a readily reactable solution consisting essentially of a saturated organic ether having at least about four carbon atoms containing from about one to about 30 parts by weight of an alkali metal manganese pentacarbonyl compound for each 100 parts of said ether.

6. The composition of claim 5 wherein said alkali metal manganese pentacarbonyl compound is sodium manganese pentacarbonyl.

7. The composition of claim 5 wherein the solution contains from about 10 to about 20 parts by weight of the alkali metal manganese pentacarbonyl compound for each 100 parts of said saturated organic ether.

References Cited in the file of this patent

UNITED STATES PATENTS 2,434,578   Miller _____ Jan. 13, 1948

OTHER REFERENCES

Brimm et al.: "Preparation and Properties of Manganese Carbonyl," J.A.C.S., vol. 76, pages 3831–3835.
Jour. of American Chem. Soc., page 1899 (May 1949).

UNITED STATES PATENT OFFICE
CERTIFICATION OF CORRECTION

Patent No. 2,967,087

January 3, 1961

Thomas H. Coffield

It is hereby certified that error appears in the above numbered patent requiring correction and that the said Letters Patent should read as corrected below.

Column 4, line 41, for "percent" read -- Centigrade --.

Signed and sealed this 29th day of August 1961.

(SEAL)
Attest:

ERNEST W. SWIDER
Attesting Officer

DAVID L. LADD
Commissioner of Patents